(12) United States Patent
Hamel et al.

(10) Patent No.: US 9,746,324 B1
(45) Date of Patent: Aug. 29, 2017

(54) ADJUSTABLE HIGH PRECISION SURVEYING DEVICE

(71) Applicants: Shayne Hamel, Eugene, OR (US); Todd Liebbe, Larkspur, CO (US)

(72) Inventors: Shayne Hamel, Eugene, OR (US); Todd Liebbe, Larkspur, CO (US)

( * ) Notice: Subject to any disclaimer, the term of this patent is extended or adjusted under 35 U.S.C. 154(b) by 685 days.

(21) Appl. No.: 14/202,776

(22) Filed: Mar. 10, 2014

Related U.S. Application Data

(63) Continuation of application No. 13/178,405, filed on Jul. 7, 2011, now Pat. No. 8,712,721.

(60) Provisional application No. 61/362,531, filed on Jul. 8, 2010, provisional application No. 61/376,585, filed on Aug. 24, 2010.

(51) Int. Cl.
*G01C 15/02* (2006.01)

(52) U.S. Cl.
CPC .................................. *G01C 15/02* (2013.01)

(58) Field of Classification Search
CPC ................................ G01C 15/06; G01C 15/02
See application file for complete search history.

(56) References Cited

U.S. PATENT DOCUMENTS

| | | | |
|---|---|---|---|
| 3,574,945 A | 4/1971 | Main et al. | |
| 3,765,764 A | 10/1973 | Niss | |
| 4,290,207 A | 9/1981 | Browning et al. | |
| 4,311,382 A | 1/1982 | Buckley et al. | |
| 4,343,550 A | 8/1982 | Buckley et al. | |
| 4,875,291 A | 10/1989 | Panique et al. | |
| 5,159,760 A | 11/1992 | Spiegel et al. | |
| 6,425,186 B1* | 7/2002 | Oliver | G01C 15/02 33/264 |
| 7,110,102 B2 | 9/2006 | Ohtomo et al. | |
| 7,254,895 B1 | 8/2007 | O'Donnell | |
| 7,272,891 B2 | 9/2007 | Lyle et al. | |
| 7,611,105 B1 | 11/2009 | Carazo | |
| 7,646,339 B2 | 1/2010 | Green et al. | |
| 7,739,803 B2 | 6/2010 | Yahagi et al. | |
| 7,788,815 B2 | 9/2010 | Yandrick et al. | |
| 7,940,211 B2 | 5/2011 | Scherzinger | |
| 8,031,332 B2 | 10/2011 | Miller et al. | |
| 8,215,025 B2 | 7/2012 | Clarke | |
| 8,712,721 B2 | 4/2014 | Hamel et al. | |
| 2007/0145217 A1 | 6/2007 | Kimura | |
| 2008/0154538 A1* | 6/2008 | Stathis | G01C 15/002 702/152 |
| 2008/0257023 A1* | 10/2008 | Jordil | G01B 21/045 73/105 |

(Continued)

OTHER PUBLICATIONS

Official Action for U.S. Appl. No. 13/178,405, mailed Aug. 2, 2013 17 pages.

(Continued)

*Primary Examiner* — Luke Ratcliffe
(74) *Attorney, Agent, or Firm* — Sheridan Ross PC

(57) ABSTRACT

Methods and devices for use in surveying operations are provided. A device is provided for selectively connecting to surveying equipment, such as a surveying pole, and is adapted for accurately adjusting a reference point in at least two axes. The device is adapted to work in conjunction with additional surveying equipment, such as theodolites and transits as well as one or more central processing units for analyzing, storing, and providing data.

20 Claims, 5 Drawing Sheets

(56) References Cited

U.S. PATENT DOCUMENTS

2010/0212169 A1\* 8/2010 Fleenor .................. G01C 15/08
33/228
2010/0302557 A1 12/2010 Petschko et al.

OTHER PUBLICATIONS

Notice of Allowance for U.S. Appl. No. 13/178,405, mailed Dec. 9, 2013 11 pages.

\* cited by examiner

ADJUSTABLE HIGH PRECISION SURVEYING DEVICE

This Non-Provisional Patent Application is a Continuation of and claims the benefit of priority from U.S. patent application Ser. No. 13/178,405, filed Jul. 7, 2011, and U.S. Provisional Patent Application Nos. 61/362,531, filed Jul. 8, 2010 and 61/376,585, filed Aug. 24, 2010, the entire disclosures of which are hereby incorporated by reference as if fully rewritten herein.

FIELD OF THE INVENTION

The present invention relates generally to devices and methods for use in surveying. More specifically, the present invention relates to devices and methods directed to facilitating the identification, marking, and/or storing of coordinates, wherein the device is arranged for use with preexisting equipment.

BACKGROUND

Various devices exist for surveying land areas and structures. Surveying instruments are known to assist in critical building and construction functions. For example, building foundations, runways, roads, roadbeds, and retaining walls must be engineered and constructed within a certain degree of accuracy if they are to perform their desired functions in a proper manner and maintain structural integrity over time. Leveling instruments, rods, theodolites, transits, laser beam measuring systems, and similar components are often used to achieve the desired degree of accuracy and precision for these features and operations.

Known devices and processes, however, waste valuable time by requiring relocation of a prism pole after measurement(s) have been taken in order to accurately mark a coordinate location. Using known processes and equipment, devices such as prisms for sighting or determining positions in combination with laser(s) are disposed on a pole. The prism reflects light back to a position locator for determining the location of the prism at different locations in a survey. The prism pole may be constructed with telescoping sections so that it may be collapsed to a reduced height (e.g., about four feet) for storage and transport, and then extended to its operating height which may be, typically, eight feet or more. Notably, however, the exact point being measured or evaluated resides directly beneath the pole. In other words, the pole typically covers the point one desires to mark.

Known devices and methods generally require at least a two step process in order to locate points. Such devices generally comprise a prism mounted on a pole and require a user to move the tip of the pole in various directions until the coordinates shown on an associated display provide a tolerance reading acceptable for the task at hand. Subsequent marking of a point is then achieved by a marking device. Prior to marking, the tip of the pole is relocated so a mark could be placed on the floor, for example. In applications where the point must be directed upwards, a self-leveling laser is then placed atop the point and the laser project upwards, further increasing the risk of human error.

Known poles are often provided with a bubble level to aid in the leveling process. Handling and relocation of the pole according to known devices and methods involves trial and error. Currently, physical relocation of the entire pole system is necessary to move it to the correct position, while also keeping the pole in a level position.

It is desirable to maintain prism poles as level as possible, as the prism generally resides at the top of the pole and should be plumb with the reference point at the bottom. If the prism and point are not aligned, significant variation in measurement occurs.

SUMMARY OF THE INVENTION

Accordingly, the present invention contemplates a novel system, device, and methods for accommodating, supporting, and adjusting devices for locating points. In various embodiments, a positioning apparatus is provided for attachment to a preexisting device, such as a prism pole. The apparatus is capable of fluid movement in at least one plane and at least two axes, thereby assisting in the reduction of time needed for accessing a desired point.

The Summary of the Invention is neither intended nor should it be construed as being representative of the full extent and scope of the present disclosure. The present disclosure is set forth in various levels of detail in the Summary of the Invention as well as in the attached drawings and the Detailed Description of the Invention and no limitation as to the scope of the present disclosure is intended by either the inclusion or non-inclusion of elements, components, etc. in this Summary of the Invention. Additional aspects of the present disclosure will become more readily apparent from the Detailed Description, particularly when taken together with the drawings.

The following references, generally related to the field of surveying, are hereby incorporated by reference in their entireties: U.S. Patent Application Nos.: 2010/0212169 to Fleenor et al. and 2010/0302557 to Petschko et al., U.S. Pat. No. 7,110,102 to Ohtomo et al., U.S. Pat. No. 7,272,891 to Lyle et al., U.S. Pat. No. 7,739,803 to Yahagi et al., U.S. Pat. No. 3,765,764 to Niss, U.S. Pat. No. 4,311,382 to Buckley et al., U.S. Pat. No. 7,788,815 to Yandrick et al., U.S. Pat. No. 5,159,760 to Spiegel et al., U.S. Pat. No. 7,254,895 to O'Donnell, U.S. Pat. No. 7,940,211 to Scherzinger, and U.S. Pat. No. 7,646,339 to Green et al.

In various embodiments, a positioning device for surveying equipment is provided. The positioning device is adapted for use in combination with, for example, commercially available devices such as the SRX Total Station from Sokkia and Sokkia's SHC2500 data collector. In a preferred embodiment, a positioning device is provided in connection with a pole, the positioning device comprising features for accommodating at least one of a prism and a self-leveling laser as well as features for selectively adjusting the prism and/or self-leveling laser in at least two axes. A central processing unit, such as a known computer, is provided. The central processing unit comprises the ability to receive information related to the position of the prism and/or self-leveling laser and convey information related to the same to a user. Various known devices may be provided in combination with the computer, such as Bluetooth, radio-frequency, or similar devices and features for communicating with a Total Station and/or known point.

The Total Station is a known instrument used to collect or layout data using angels and distance. It is a combination of an electronic distance measuring device, a electronic theodolite (transit), and software running on an external computer or data collector. A Total Station is generally provided with a data or job file. Information contained within this file may be used in conjunction with data collector software and can contain different types of data depending on the project. A suitable location to mount or setup the Total Station is determined and the Total Station attached to a tripod or column clamp and leveled. Once the Total Station has been appropriately setup, the data collector and software are utilized to take distance and angle readings. Measurements can be derived by shooting or sighting a prism or reflector with the Total Station's electronic distance measuring device. Information is then converted by the data collector software to a measurement that can be used and understood and saved in the data or job file.

Devices and features of the present invention may be employed to accurately determine the position of a point with respect to a known point or control point, calculate the distance between two known points, and/or locate a point at a desired distance away from one or more known points.

In various embodiments, a positioning device comprises various features for manually adjusting the position of a prism and/or self-leveling laser. Such features may include, but are not limited to, indicia on the device for conveying information to a user, dials and gearing for adjusting position, and selectively operable clamps or fasteners for securing a prism and/or laser in a desired location.

It is further contemplated that the positioning device is provided with various automated adjustment features. For example, a device may be provided with one or more battery packs and one or more motors for accurately and automatically adjusting the position of a prism with respect to a pole and/or laser. Accordingly, where the Total Station and central processing unit have determined that a prism is not located in a desired position, the central processing unit may calculate the offset and send a signal with the desired correction to the automated adjustment features. Once the central processing unit has determined that the prism is in a desired final location, the positioning device is brought to rest and an indication that a point has been located may be provided. Such indications may comprise audio or visual indicia alerting a user that a desired point has been located and marking operations may be conducted. In one embodiment, marking operations are also automated. For example, once a point has been located, the central processing unit may then direct a self-leveling laser provided in connection with a prism to project a point on a ground or surface.

In various embodiments, therefore, manual manipulation of the positioning device and prism is therefore reduced or eliminated. Once a surveying pole is placed proximal to a point to be located, minor adjustments in the location of the prism are controlled by the central processing unit based on information received from the Total Station or theodolite related to the exact position of the prism.

In an alternative embodiment, the device comprises an adjustable articulating arm attached to a pole via various attachment means and further attached to an additional apparatus, such as a self-leveling laser, marking device, and/or a prism. Such a device provides a stable, reliable, and traceable mechanism for locating a prism at a distance away from, but attached to, the prism pole. By positioning the prism away from the pole, the ultimate position being measured is no longer obstructed and a user can mark the location without having to move the pole. Known devices such as the SRX Total Station in combination with a central processing unit provide the ability to accurately determine the position of the prism and convey information related to the same, including whether or not the prism is in a desired location and specifically which adjustment(s) may be required.

Aspects and embodiments of the present invention provide for various advantages and benefits. For example, the positioning device attached to a surveying pole provides for an offset of the prism and self-leveling laser or other marking from the pole. Known devices and methods provide a pole for locating point, wherein the pole must be moved or relocated in order to mark a desired point, as this point will typically reside directly underneath the pole. Additionally, known devices also require that the pole must be leveled in the vertical direction, typically with the assistance of a bubble level, in order to ensure minimal offset between the prism and the point on the surface to be marked. In contrast, the present invention provides a positioning device for positioning equipment in a manner wherein a point may be indicated (e.g. via a self-leveling laser) without the need for repositioning a pole and reducing or eliminating the need for manual leveling operations once a point has been located.

Embodiments of the present invention reduce or eliminate the criticality that the pole is level (i.e. completely vertical) as the prism and a self-leveling laser are in close proximity to each other, eliminating error.

In various embodiments, a positioning device is provided for attaching to a preexisting device, wherein one or more adjustable sliders provide for translation about a generally horizontal plane. An apparatus for securing a prism, a self-leveling laser and/or a marking device is further provided. In one embodiment, the positioning device comprises a clamp or similar device for secure and selective attachment to a pole on a first end. The device further comprises an additional element for accommodating and/or securing a prism and/or marking device at a point generally distal from the pole. The device comprises the ability to translate the additional prism and/or marking device in at least two axes (e.g. X and Y translation) to enable the prism and/or marking device to be located at a desired point.

In various embodiments, the positioning device is attached to a mono/bi/tripod device and placed at whatever height is needed dependant on the conditions of the jobsite. While various embodiments described herein refer to the positioning device being attached to a prism or surveying pole, it will be expressly recognized that the present invention is not so limited. Indeed, the positioning device of the present invention may be secured to and used in conjunction with a variety of objects.

In one embodiment, a positioning device connects to a pole and enables a prism and self-leveling laser to move in various directions with respect to the pole. The positioning device allows a self-leveling laser capable of projecting a laser in various directions to be secured thereto. The self-leveling laser may project a point in any number of directions, including directly downward to a ground surface and upward to a ceiling or roofing surface. A prism may be secured in connection with the laser. The positioning device allows adjustment of the laser's position along at least the x and/or y plane as needed. In various embodiments, alternative marking device(s) could be used in addition to or in lieu of a self-leveling laser.

In various embodiments, a method of surveying is contemplated. In one embodiment, a Total Station is set up and paired with a data collector. The Total Station may be set up, for example, at a known point from which precise distances may be measured. Once the Total Station is set up, an operator instructs the Total Station to locate a prism and "lock on" to the prism to track its position in real time. The data collector will indicate the direction an operator needs to move the prism and associated features to get close to the point location. At this stage, macro-scale positioning of the pole and associated equipment are conducted by moving the pole and associated equipment. Once the pole and associated equipment are proximal to the point (e.g. within a functional range of the positioning device), the pole is positioned in a stationary manner. The pole may be provided with a footer or stand to enable it to remain upright or may comprise a tripod, bipod, or similar device. Once the position of the pole is established, the central processing unit and/or data collector indicates the necessarily adjustments required to bring the prism to its precise desired location. In one embodiment, an operator adjusts the positioning apparatus and the central processing unit continually displays information related to the position and/or required movement of the prism. Once the prism has reached the proper location, within an acceptable tolerance, the central processing unit displays or provides an indication that no further adjustment is required.

In various embodiments, a prism is placed in close proximity with a self-leveling laser, thereby ensuring an accurate projection of a point from the prism (i.e. the exact point of measurement). Such proximity in combination with self-leveling aspects of the laser allow for a point to be projected or indicated immediately upon positioning the prism in its desired location, further reducing work time and the potential for human error.

As used herein, the term "vertical" shall be read to mean generally perpendicular with the plane of the horizon or generally parallel with the gravitational force of the earth. The term "horizontal" as used herein shall be read to mean generally parallel with the plane of the horizon or generally perpendicular to a vertical orientation.

These and other advantages will be apparent from the disclosure of the invention(s) contained herein. The above-described embodiments, objectives, and configurations are neither complete nor exhaustive. As will be appreciated, other embodiments of the invention are possible using, alone or in combination, one or more of the features set forth above or described in detail below. Further, the summary of the invention is neither intended nor should it be construed as being representative of the full extent and scope of the present invention. The present invention is set forth in various levels of detail in the summary of the invention, as well as, in the attached drawings and the detailed description of the invention and no limitation as to the scope of the present invention is intended to either the inclusion or non-inclusion of elements, components, etc. in this summary of the invention. Additional aspects of the present invention will become more readily apparent from the detailed description, particularly when taken together with the drawings.

BRIEF DESCRIPTION OF THE DRAWINGS

Those of skill in the art will recognize that the following description is merely illustrative of the principles of the disclosure, which may be applied in various ways to provide many different alternative embodiments. This description is made for illustrating the general principles of the teachings of this disclosure invention and is not meant to limit the inventive concepts disclosed herein.

The accompanying drawings, which are incorporated in and constitute a part of the specification, illustrate embodiments of the disclosure and together with the general description of the disclosure given above and the detailed description of the drawings given below, serve to explain the principles of the disclosures.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

Figure 1:
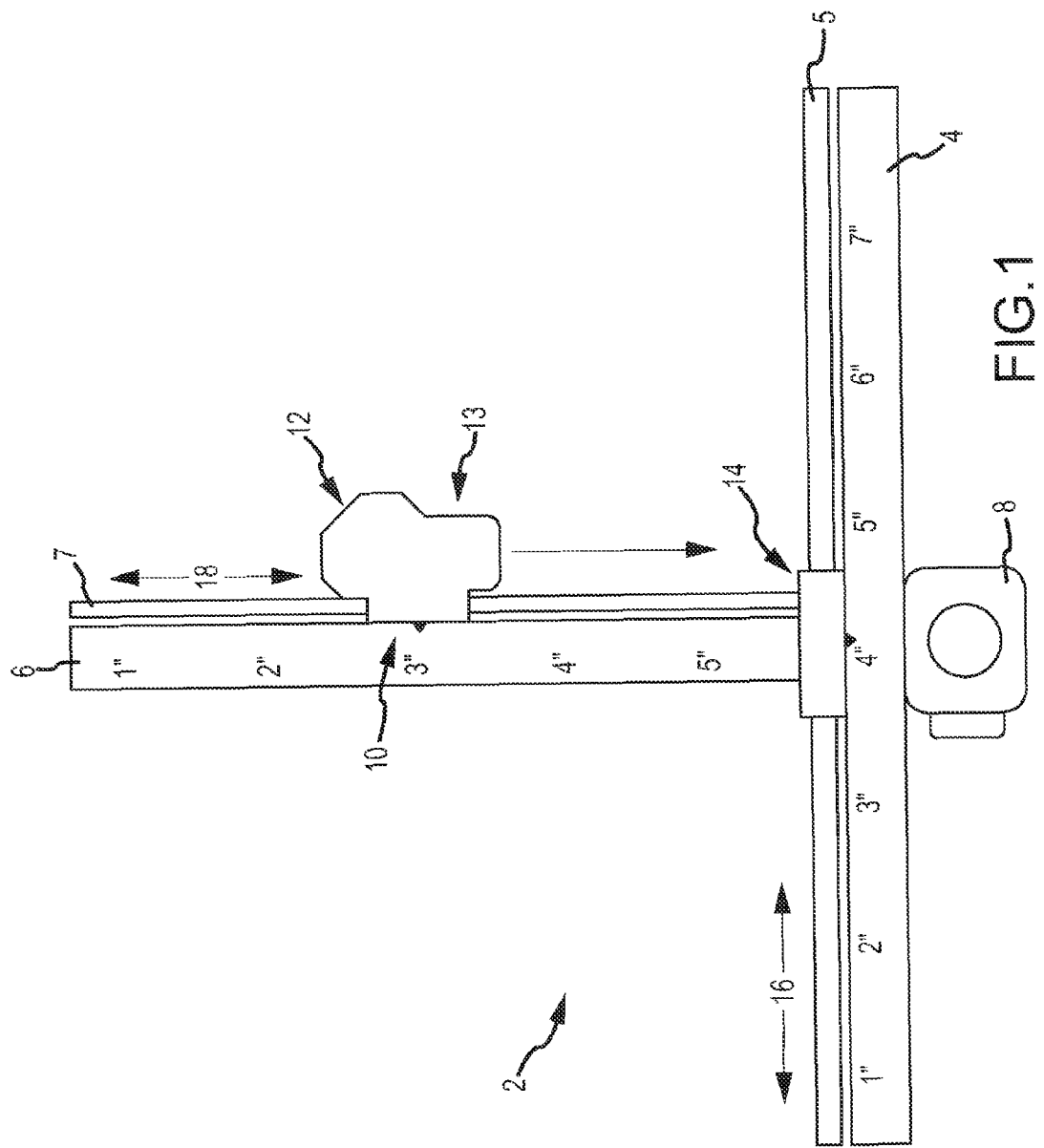
Figure 2:
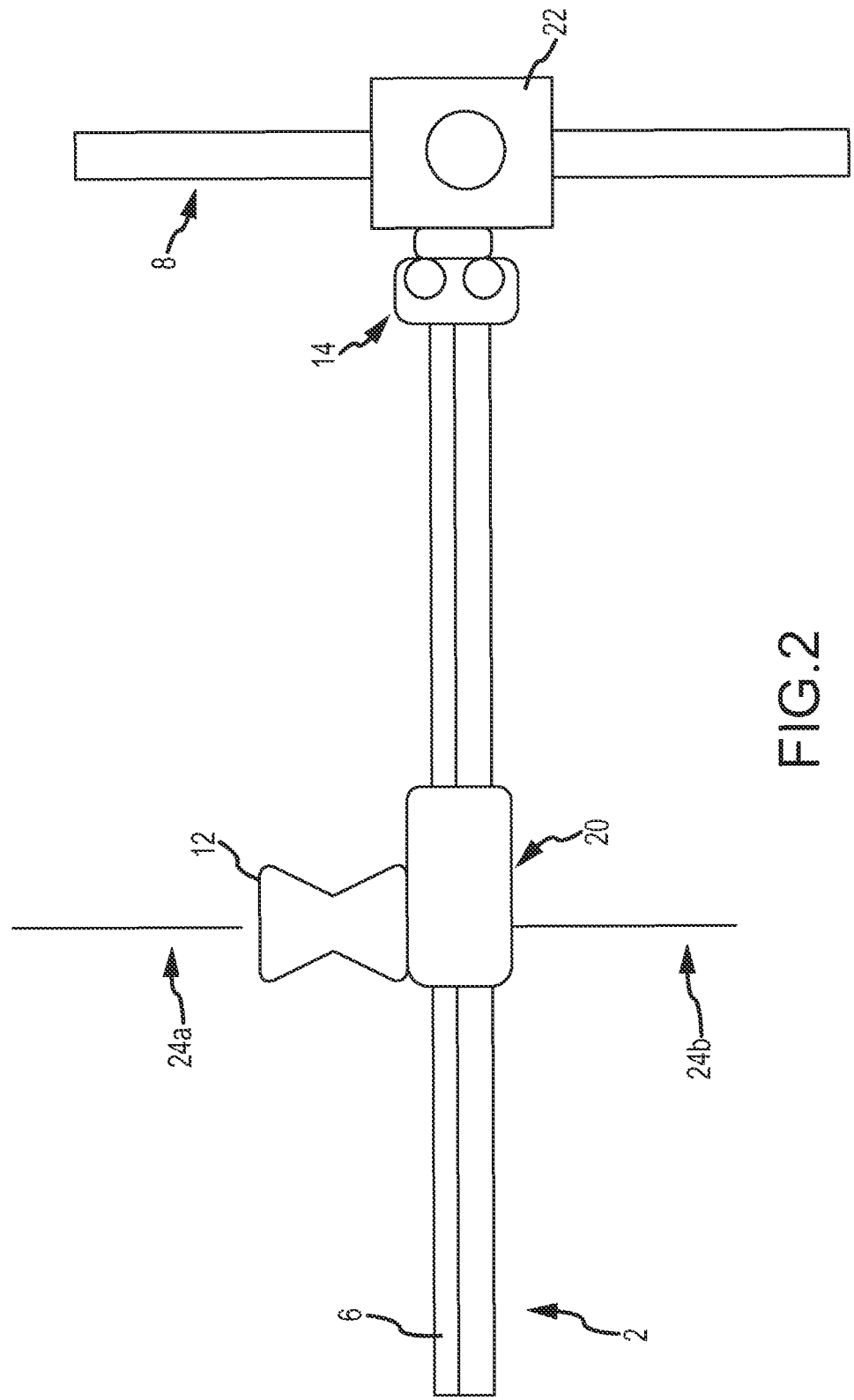
Figure 3:
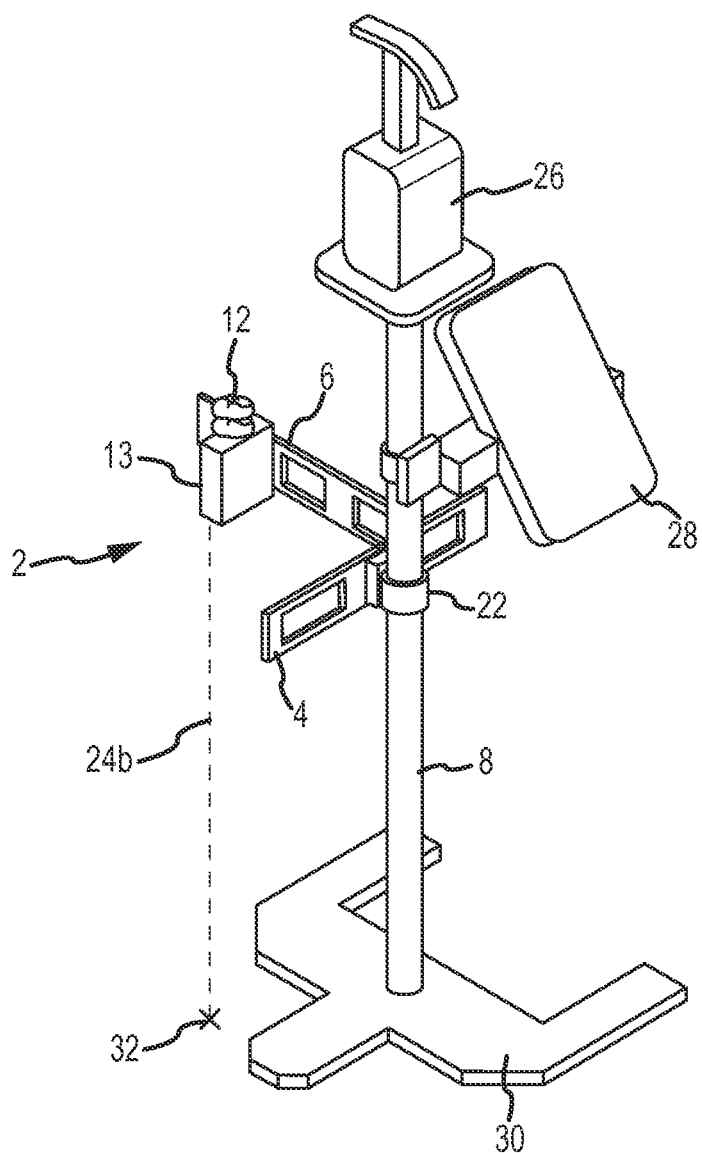
Figure 4:
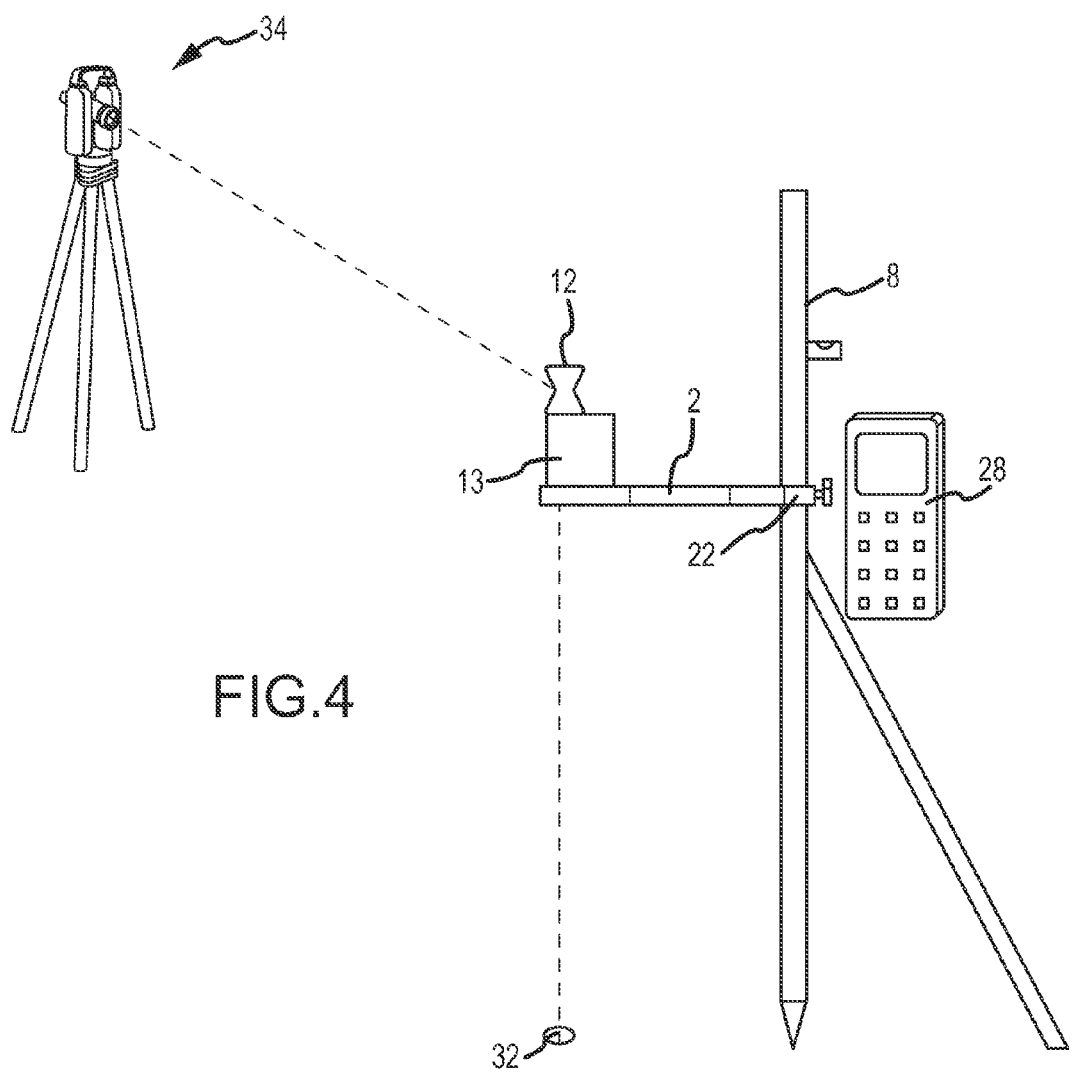
Figure 5:
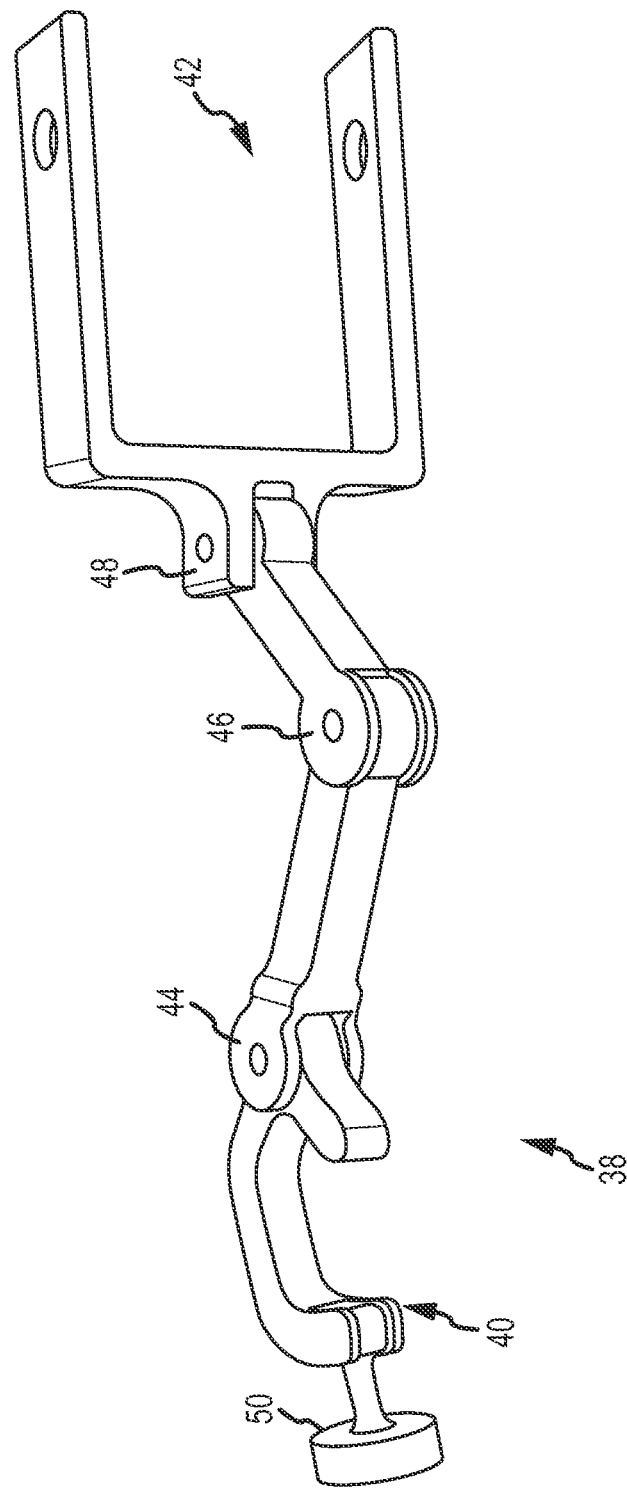

FIG. 1 is a top plan view of a positioning device according to one embodiment;

FIG. 2 is a side elevation view of a positioning device according to one embodiment;

FIG. 3 is a front perspective view of a positioning device and associated features according to one embodiment;

FIG. 4 is a perspective view depicting various features of the present invention;

FIG. 5 is a front perspective view of a positioning device according to an alternative embodiment.

DETAILED DESCRIPTION

The present invention has significant benefits across a broad spectrum of endeavors. It is the applicant's intent that this specification and the claims appended hereto be accorded a breadth in keeping with the scope and spirit of the invention being disclosed despite what might appear to be limiting language imposed by the requirements of referring to the specific examples disclosed. To acquaint persons skilled in the pertinent arts most closely related to the present invention, a preferred embodiment of the method that illustrates the best mode now contemplated for putting the invention into practice is described herein by, and with reference to, the annexed drawings that form a part of the specification. The exemplary method is described in detail without attempting to describe all of the various forms and modifications in which the invention might be embodied. As such, the embodiments described herein are illustrative, and as will become apparent to those skilled in the arts, can be modified in numerous ways within the scope and spirit of the invention, the invention being measured by the appended claims and not by the details of the specification.

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Referring now to FIGS. 1-5, a positioning device and related components according to various embodiments of the present invention are shown. It should be understood that the drawings are not necessarily to scale. In certain instances, details that are not necessary for an understanding of the invention or that render other details difficult to perceive may have been omitted from these drawings. It should be understood, of course, that the invention is not limited to the particular embodiments illustrated in the drawings.

Referring now to FIG. 1, a positioning device 2 is shown in plan view. As shown, the device 2 comprises members 4, 6 extending in a horizontal plane. Members 4, 6 are attached to, for example, a surveying pole 8 disposed in generally vertical orientation. Pole 8, while selectively movable by a user, generally resides in a fixed location during operation of the positioning device 2. The pole 8 may comprise a monopod, bipod, tripod, quadrapod, or various similar device as will be recognized by one of skill in the art. Wherein a single pole or monopod is used, a footer or stand may be provided at its base or it may be manually supported.

A member 4 is provided and disposed generally perpendicular to the orientation of the pole 8. The member 4 thus extends in a generally horizontal plane when the pole 8 is disposed vertically. A rail 5 is provided in connection with and generally parallel to the member 5. A bearing unit 14 is attached to and translatable in the y-direction 16 along the rail 5. Bearing unit 14 provides support for member 6 and corresponding and generally parallel rail 7 upon which an additional bearing unit 10 is provided. Additional bearing unit 10 is translatable in the x-direction 18 and is provided to accommodate, house, hold, or secure at least one of a prism 12 and a self-leveling laser (FIG. 2, 20) or similar marking device. Members 4, 6 define a region of two dimensional space within which components, such as a prism, may be translated. Translation may occur by manually moving bearing units 10, 14 until an associated prism 12 or similar device is at a desired location. To assist with positioning, indicia such as markings related to distance may be provided on one or both members 4, 6 and visible to a user. The positioning device 2 may be secured to the pole 8 by a variety of means including, but not limited to, a selectively securable device that allows the device 2 to be translated along a height of the pole 8, thereby altering the position of the device 2 in the z-axis.

FIG. 2 is an elevation view of the embodiment shown in FIG. 1. A pole 8 is shown in a vertical position with member 6 attached thereto and extending in the x-direction. A prism 12 and self-leveling laser are provided in translatable association with member 6. Member 6 and associated features are translatable in the y-direction based on their connection with y-direction member 4 and bearing unit 14. Members 4, 6 are secured to the pole 8 via connection means 22. Connection means 22 are contemplated to include, but are not limited to, various clamps, braces, fasteners, set screws, and similar devices for selectively loosening, tightening, and/or adjusting the position of the device 2.

The prism 12 is provided proximal to a self-leveling laser which is capable of projecting a beam and indicating a point in a variety of directions, including upwardly 24a and/or downwardly 24b. One or more points projected by the self-leveling laser may then be marked by a variety of known devices and methods. The prism and self-leveling laser may be provided in any number of physical arrangements. For example, in one embodiment, a prism resides on and in contact with a self-leveling laser. In alternative embodiments, the prism and self-leveling laser are provided generally proximal to one another, such as in connection with the same bracket or similar device, but need not be in direct contact or any particular relative position with respect to one another.

FIG. 3 is a front perspective view of one embodiment of the present invention. As shown, a pole 8 is supported by footer 30. The pole 8 supports the positioning device 2, Bluetooth unit 26, and central processing unit 28 ("CPU"). One of skill in the art will recognize that it may be desirable to position components, such as the CPU 28, proximal to the prism 12. However, as such devices may comprise wireless communication features, it will be expressly recognized that such features need not be directly connected to the pole 8 and may be provided or disposed in any number of user-desired or convenient locations. In various alternative embodiments, a CPU may be provided in combination with a Total Station, in addition to or in lieu of a CPU provided proximal the pole 8.

The positioning device 2 comprises first member 4 and second member 6 for supporting and/or translating a prism 12 and self-leveling laser 13 in two-dimensional space. The device 2 is adjustable in the vertical or z-direction by means of connection 22. A known theolodite or Total Station (not shown) is provided and adapted for line-of-sight communication with the Bluetooth unit 26, CPU 28 and/or prism 12. In order to locate a point, the positioning device 2, pole 8, and associated equipment are moved manually to the general location of the desired point (i.e. the pole is positioned such that the desired point is within a functional range of the device 2). The CPU 28 may indicate when this condition has been met and the pole 8 may be set down. A laser is aimed or directed at the prism 12 and allows for the Total Station to determine the position of the prism 12 and any offset or discrepancy between the prism 12 and a desired point.

Information related to a desired point and any necessary movement of the prism is conveyed to the CPU 28 via the Total Station and/or Bluetooth 26. The CPU 28 processes data related to the position of the prism 12 and desired point and provides indicia or instructions to a user related to the necessary movement of the prism 12 and device 2. The device 2 enables movement of the prism 12 in both the x and y directions until the prism 12 is directly above a desired point. Once the prism 12 is properly positioned, the CPU provides an indication to a user that no further adjustments of the device 2 are necessary. A self-leveling laser 13 associated with the prism 12 may then selectively project and/or indicate a point 32 via laser 24b. The laser 13 may project a beam based upon a user input, such as an activation of a switch, or may be prompted by the CPU 28 to project one or more beams.

Any number of subsequent marking procedures and devices may then be used to mark the point 32. Furthermore, once the appropriate point has been located, information related to the same may be stored in the CPU for further operations.

In various embodiments, positioning of the prism 12 and associated self-leveling laser 13 may be accomplished through various automated features. For example, the CPU 28 may process required movement(s) of the prism 12 and/or laser 13 and provide signals or instructions to, for example, one or more servo motors adapted to translate the prism 12 and laser 13 in the x and/or y direction(s) as needed.

One of skill in the art will recognize that the CPU 28 may comprise any number of known devices for sending, receiving, storing, and/or processing data. Thus, the present invention is not limited to any particular device. In one embodiment, the CPU comprises a device such as the commercially available Mesa Rugged Notepad from Juniper Systems.

FIG. 4 is a schematic depicting surveying equipment operations according to one embodiment of the present invention. As shown, a Total Station or theolodite 34 is set up at a known point, such as corner of a parcel, specific landmark or feature, etc. The Total Station is then capable of projecting a laser 36 to a prism 12 and thereby determines the distance between the known point and the prism 12. As shown, the prism 12 is positioned directly above a self-leveling laser 13 capable of projecting a point 32 upon a surface. The prism 12 and laser 13 combination are disposed on a positioning device 2 capable of accurate adjustment in at least the x and y directions. The Total Station 34 is in communication with a CPU 28 disposed on or proximal to the pole 8, and is thus capable of transmitting data related to the precise position of the prism 12 to the CPU 28. Once information related to the physical position of the prism 12 is transferred to the CPU 28, the CPU 28 may process the data as needed. For example, the CPU 28 may compare the position of the prism 12 with a known or desired point to be located, compute a the necessary movement or offset needed to bring the prism 12 in line with the point, display instruction related to the necessary movement, and/or provide signals to additional components to automatically reposition the prism.

Once the positioning device 2 is appropriately adjusted such that the prism 12 is aligned with a desired point, the CPU 28 indicates that no further adjustment of the device 2 and/or prism 12 is required. The self-leveling laser 13 may then be activated to project a point, such as in an upward or downward direction in order to indicate a point 32. Once the point 32 is indicated by the laser, it may then be marked by a variety of known methods and devices.

FIG. 5 is a perspective view of a positioning device 38 according to an alternative embodiment of the present invention. As shown the positioning device 38 generally comprises an articulating arm for attaching to a pole on a first end 40 and a receiving portion 42 for securing a prism, self-leveling laser, and/or marking device. The device 38 is capable of motion about a plane in both the x and y directions by movement of one or more hinges 44, 46, 48 provided along a length of the device 38. Tracking of the position of attached components, such as a prism or laser (not shown), is accomplished through line-of-sight communication with a Total Station in further communication with a CPU as discussed herein.

Various means for securing the device 38 to a pole or similar device may be provided. For example, a set screw 50 may be provided to frictionally engage a pole provided through a first end 40 of the device 38. It will be expressly recognized that any number of securing means, such as spring clamps, may be provided to secure the device 38 to a desired object.

While various embodiments of the present invention have been described with respect to a prism or surveying pole, it is contemplated that a positioning device of the present invention may be used with any number of objects. For example, where one desires to accurately locate a point known to be generally proximal to a preexisting object, such as a fence post, it is contemplated that a positioning device in accordance with embodiments of the present invention may be selectively secured to the fence post and positioning operations as discussed herein conducted in order to precisely locate a desired point. After positioning and marking operations have been conducted, the positioning device is removed from the preexisting object and available for use in additional operations. Accordingly, it will be recognized that while various embodiments contemplate use of known surveying equipment, such as prism poles, devices and methods of the present invention are not so limited.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims.

Further, the invention(s) described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

What is claimed is:

1. A system for locating and marking one or more locations, comprising:
   a first device in association with a first location;
   a second device comprising a substantially vertical member;
   a positioning device attached to said second device and extending from said device in a plane;
   an object in communication with said positioning device, wherein said positioning device is capable of selectively positioning said object in a plurality of locations about the plane;
   said first device capable of determining a relative distance of said object; and
   a central processing unit in communication with at least one of said first device and said object, said central processing unit providing information related to the relative location of said object;
   wherein said positioning device comprises a first member extending in a first direction and a second member extending in a second direction, said first direction being coplanar with and substantially perpendicular to said second direction,
   at least one of said first member and said second member translatable in said first direction;
   said second member comprising a device for receiving at least one of a prism, a reflective surface, and a self-leveling laser, said device translatable with respect to said second member in said second direction.

2. The system of claim 1, wherein said object comprises a surveying prism.

3. The system of claim 1, wherein said first device is a Total Station.

4. The system of claim 1, wherein said object comprises a surveying prism and a self-leveling laser.

5. The system of claim 1, wherein said second device comprises at least one of a pole, bipod, and a tripod.

6. The system of claim 1, wherein said positioning device is controlled by said central processing unit.

7. A method for locating and marking a location, comprising:
   providing a first device in association with a first predetermined point;
   providing a second device comprising a vertical member;
   providing a positioning device attached to said second device and extending from said device in a horizontal plane;
   determining the relative distance of an object disposed on said positioning device from said first device;
   based on said determining step, selectively positioning said object in a desired location within a horizontal plane; and
   projecting a point on at least one surface and marking the point; and
   wherein said positioning device comprises a first member extending in a first direction and a second member extending in a second direction, said first direction being coplanar with and perpendicular to said second direction, at least one of said first member and said second member being translatable in said first direction; and at least one of said first member and said second member comprising a device for securing at least one of a prism, a reflective surface, and a self-leveling laser, said device translatable with respect to at least one of said first member and said second member.

8. The method of claim 7, wherein the relative distance of said object from said first device is conveyed to a central processing unit.

9. The method of claim 7, wherein said central processing unit indicates a required movement of the device.

10. The method of claim 7, wherein said first device is a Total Station.

11. The method of claim 7, wherein said second device comprises at least one of a pole, bipod, and a tripod.

12. A system for locating a position, the system comprising:

a first device provided in a first location;

a positioning device provided in at least one plane and provided for visual communication with the first device;

the positioning device being selectively positionable in a plurality of locations about the plane;

said first device capable of determining a relative distance of said positioning device;

a central processing unit in communication with at least one of said first device and said positioning device, said central processing unit providing information related to the relative location of said positioning device;

wherein said positioning device comprises a first member extending in a first direction and a second member extending in a second direction, said first direction being substantially perpendicular to said second direction;

wherein said positioning device comprises at least one of a prism, a reflective surface, and a self-leveling laser translatable with respect to at least one of said first member and said second member.

13. The system of claim 12, wherein the first member comprises a substantially vertical support member.

14. The system of claim 12, wherein the second member comprises a substantially rigid member extending laterally away from the first member.

15. The system of claim 12, wherein the second member comprises a hinge for providing freedom of movement for said at least one of a prism, a reflective surface, and a self-leveling laser.

16. The system of claim 12, wherein the second member is rotatable about the first member.

17. The system of claim 12, wherein said first device comprises a Total Station.

18. The system of claim 12, wherein the second member comprises a tripod.

19. The system of claim 12, wherein said positioning device is controlled by said central processing unit.

20. The system of claim 12, wherein said central processing unit indicates a required movement of the second member.

* * * * *